INVENTORS.
Franklin A. Stearn
BY Lionel P. Hopkins
ATTORNEY

INVENTORS.
Franklin A. Stearn
BY Lionel P. Hopkins
Percy P. Lantzy
ATTORNEY

INVENTORS.
Franklin A. Stearn
BY Lionel P. Hopkins
Percy P. Lantzy
ATTORNEY

INVENTORS.
Franklin A. Stearn
BY Lionel P. Hopkins
Percy P. Lantzy
ATTORNEY

Patented July 24, 1951

2,561,426

UNITED STATES PATENT OFFICE 2,561,426

TELEPHONE SWITCHBOARD WITH EXPANSIBLE BAYS AND CABLE RACKS

Franklin A. Stearn, Westfield, N. J., and Lionel P. Hopkins, New York, N. Y., assignors to Federal Telephone and Radio Corporation, New York, N. Y., a corporation of Delaware Application October 11, 1947, Serial No. 779,340

11 Claims. (Cl. 179—91)

This invention relates to telephone switchboards and more particularly to a portable switchboard composed of sections that are of a size and weight convenient for transportation and which may be readily assembled for use.

In communications, particularly in times of national emergency for use with the armed forces and during emergencies such as resulting from storms, floods, etc. where normal communication systems are disrupted, it is important to have a portable telephone exchange and switchboard equipment that may be quickly transported and assembled. It is also important that such a portable equipment be sturdy, compact, the parts thereof capable of resisting abuse, not only in rough handling, but when subjected to contact with dirt, sand and other foreign particles. It is accordingly an object of the present invention to provide a switchboard for a portable telephone exchange which fulfills the foregoing and other requirements; and to construct component groups which when assembled provide a sturdy switchboard unit whereby the telephone circuits and connections are not easily damaged; and if certain parts are damaged to so construct them that they can be quickly replaced.

In accordance with our invention, one of the main features is the provision of box-like frame sections to house switchboard equipment in convenient groups. The sections are provided with sturdy connections which resist fouling by the presence of dirt, sand, etc., and which when fastened make a sturdy bank of sections suitable for switchboard operation. The box-like sections may be subdivided depending on the components or group units to be received therein, the units being received in predetermined relation and held in position by sturdy clamps. The sections are also provided with collapsible cable supporting brackets and cable connectors are provided which are readily releasably securable to the switchboard units.

Another feature of the invention is the combination arrangement of cable connectors and switchboard units having a plurality of jacks and indicators whereby the terminals of a cable connector are brought into predetermined engaging relation with corresponding terminals on the switchboard unit.

Another feature is the arrangement of the cable connector and the switchboard unit whereby a predetermined resilient engagement is insured, the connector and unit being provided with cam latch arrangements to insure the predetermined connecting arrangement.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
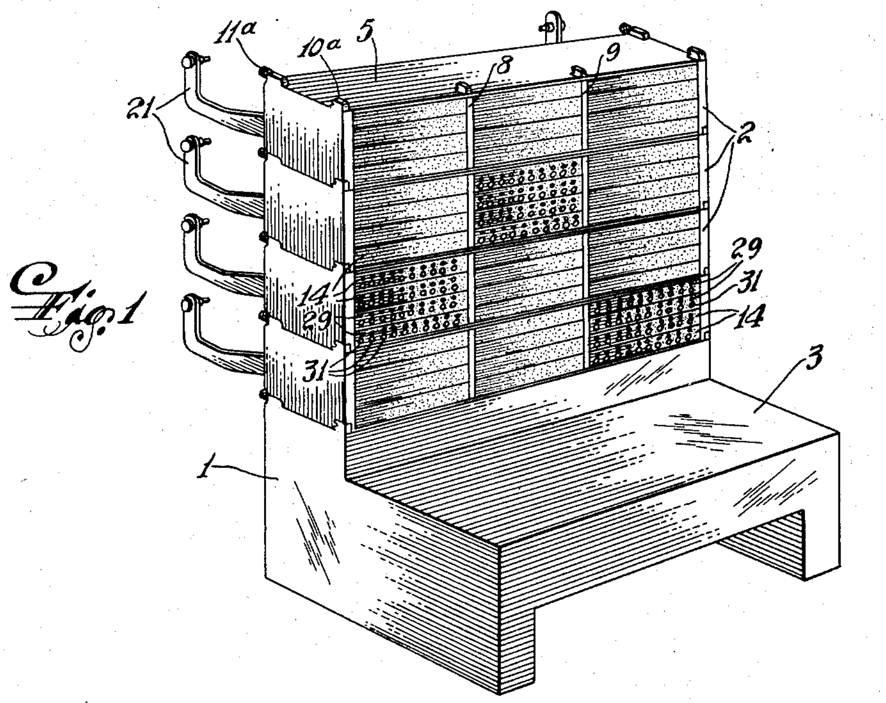
Fig. 1 is a view in perspective of a portable switchboard in accordance with our invention, indicating the arrangement of switchboard units in the portable sections thereof.
Figure 2:
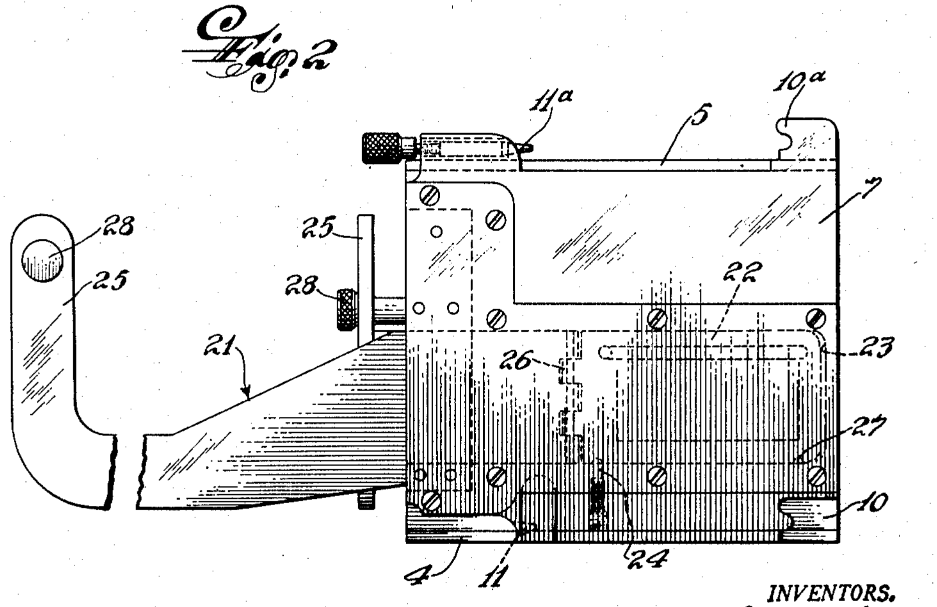
Fig. 2 is a side view of one of the box-like sections.

In Fig. 1 of the drawings is shown in perspective a portable switchboard comprising a base 1 and a plurality of switchboard sections 2 mounted thereon. The base is provided with a keyboard 3, the keys and plugs of which are not shown. Each switchboard section comprises a box-like frame which is subdivided to receive tiers of switchboard units each of which contain a bank of jacks and indicator lamps.

Referring more particularly to Figs. 2, 3, 4 and 5, the box-like section comprises a frame made up of a bottom plate 4, a top plate 5, end walls 6 and 7, and partitions 8 and 9. The bottom plate includes recesses 10 and 11, Figs. 1 and 2, while the top plate has a corresponding hook 10*a* and a locking pin 11*a* for engagement with the recesses 10 and 11 of the next section superimposed thereon. The end walls and partitions are provided with pins 12 and recess 13 which serve to locate the combination jack and indicator units 14, Figs. 1 and 6. The units 14 are provided with recesses 15 and pins 16 which coact with pins 12 and recess 13, respectively, when a unit is placed in the frame section. This determines the position of the unit and should it be desirable to remove the units disposed therebeneath they may be removed without disturbing those above them. On the rear of the frame section is a pivoted clamp bar 17, Fig. 5, the clamp when raised to the dotted position, is held there by spring detent 18. When the clamp is moved to the lowered position it engages the pins 16 of the units 14, the clamp being latched in this position by a spring biased locking bolt 19. When a unit is to be removed the bolt is lifted by raising pin 20.

In order to support cable leading to the switchboard units 14, cable supporting brackets 21 are provided. The inner bracket portion 22 is received in recess 23 in an end wall of the frame section and is held in its inner position by a spring detent 24. The outer portion 25 of the bracket 21 is hinged to the inner portion 22 at 26. When the bracket is in the inner position shown in Fig. 2, the hinge 26 extends well within the recess 23 and the walls of the recess brace the bracket making it a sturdy support. When the unit is to be transported, the cables are removed and each bracket is pulled outwardly until the hinge 26 is exposed at the entrance to the recess 23. The recess 27 on the inner portion 22 is engaged by detent 24 thereby retaining the bracket in this position. The outer portion 25 may then be swung around adjacent to the rear of the section and secured thereto by thumbscrew 28.

Figure 6:
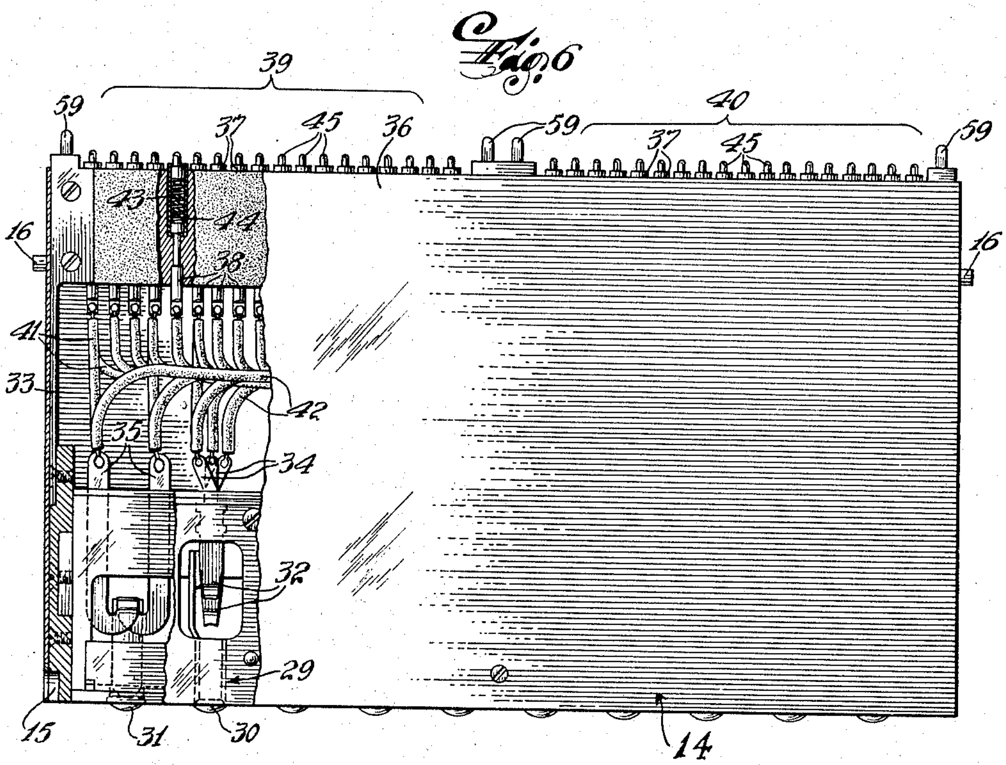
Fig. 6 is a view in plan of a switchboard unit with parts broken away to show details.
Figure 7:
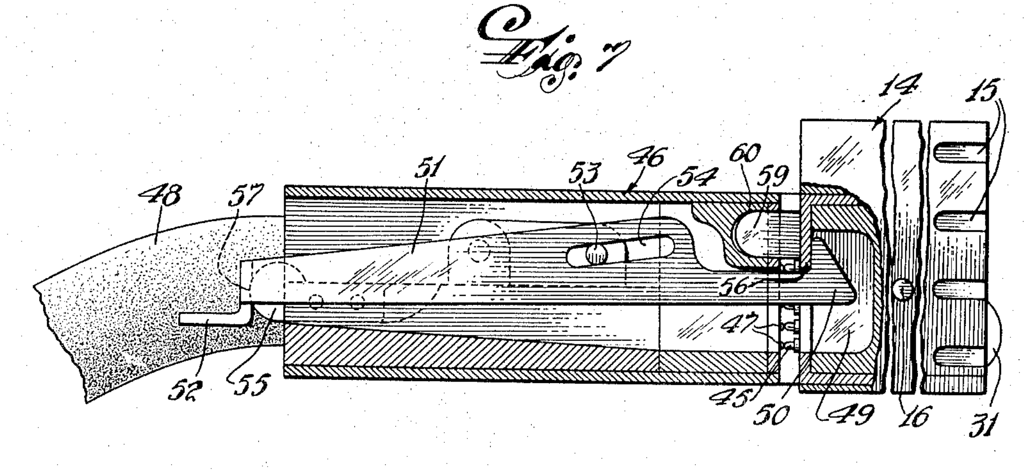
Fig. 7 is a sectional view taken along line 7—7 of Fig. 4, to show the latch and cam mechanism of the cable connector and the connecting part of a switchboard unit.

A jack and indicator unit is shown in Figs. 1, 6 and 7. It comprises a frame like body of rectangular shape, the front wall of which is provided with a row of jacks 29 with openings 30 for jack plugs. Associated therewith is a row of indicator lamps 31, one for each jack. Associated with each jack are spring contact leaves 32 which are actuatable by insertion of a plug to control a particular telephone circuit. The contact leaves 32 project into space 33 as indicated at 34. Conductor terminals 35 from the lamp sockets also project into space 33. In the rear wall 36 are mounted a plurality of spring contact terminals 37 with their inner ends 38 projecting into the space 33. The contacts 37 are arranged in two groups 39 and 40, as indicated in Fig. 6. When wired, the incoming circuit terminals of group 39 are connected by wires 41 to certain of the lamp and jack terminals and the outgoing circuit wires 42 leading from the lamp and jack terminals are connected to the terminals of group 40. Each terminal 37 is provided with a spring 43 enclosed in casing 44 to urge contact element 45 outwardly.

Figure 3:
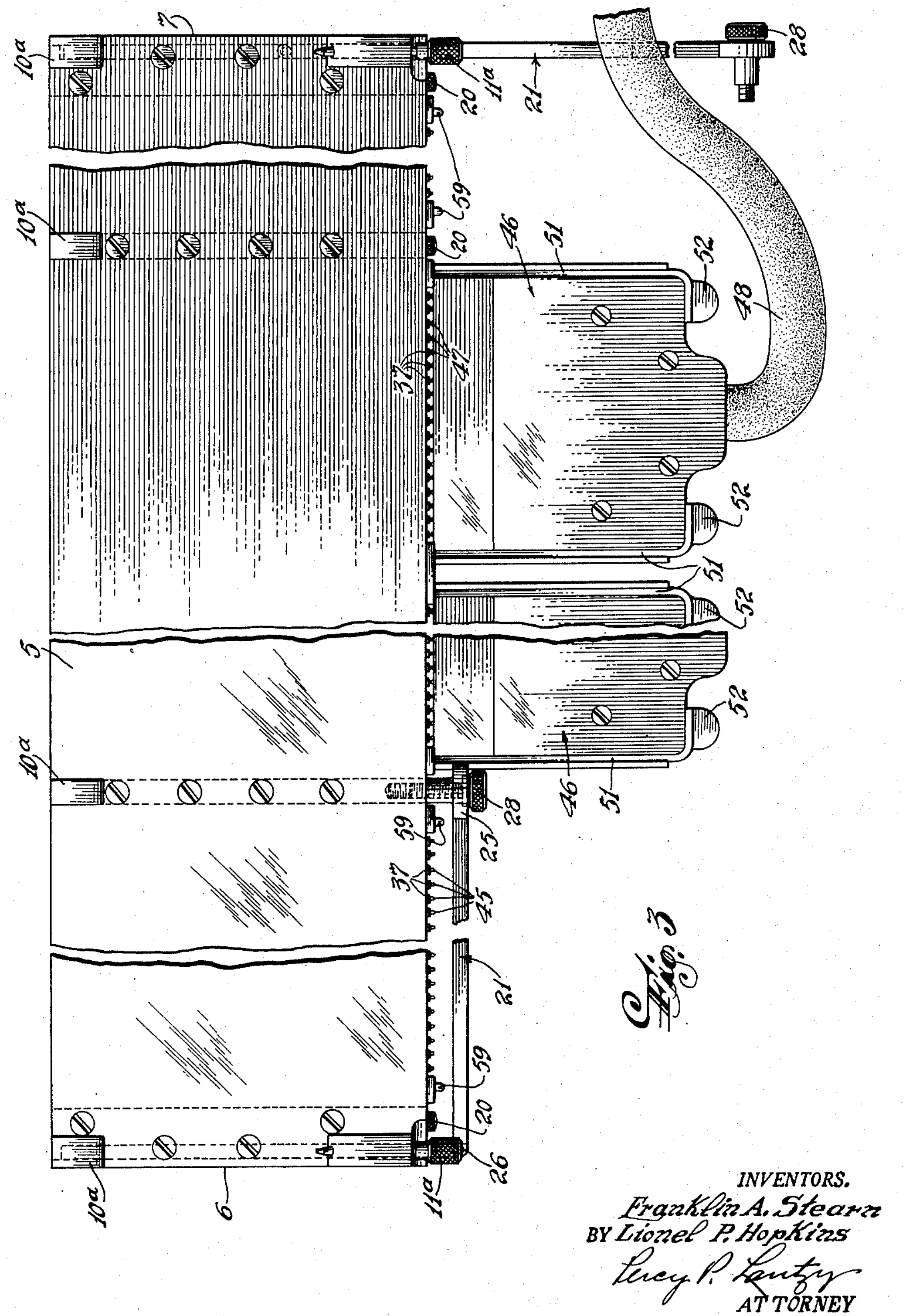
Fig. 3 is a view in plan of Fig. 2, showing two cable connectors secured to one of the switchboard units thereof.
Figures 4, 5:
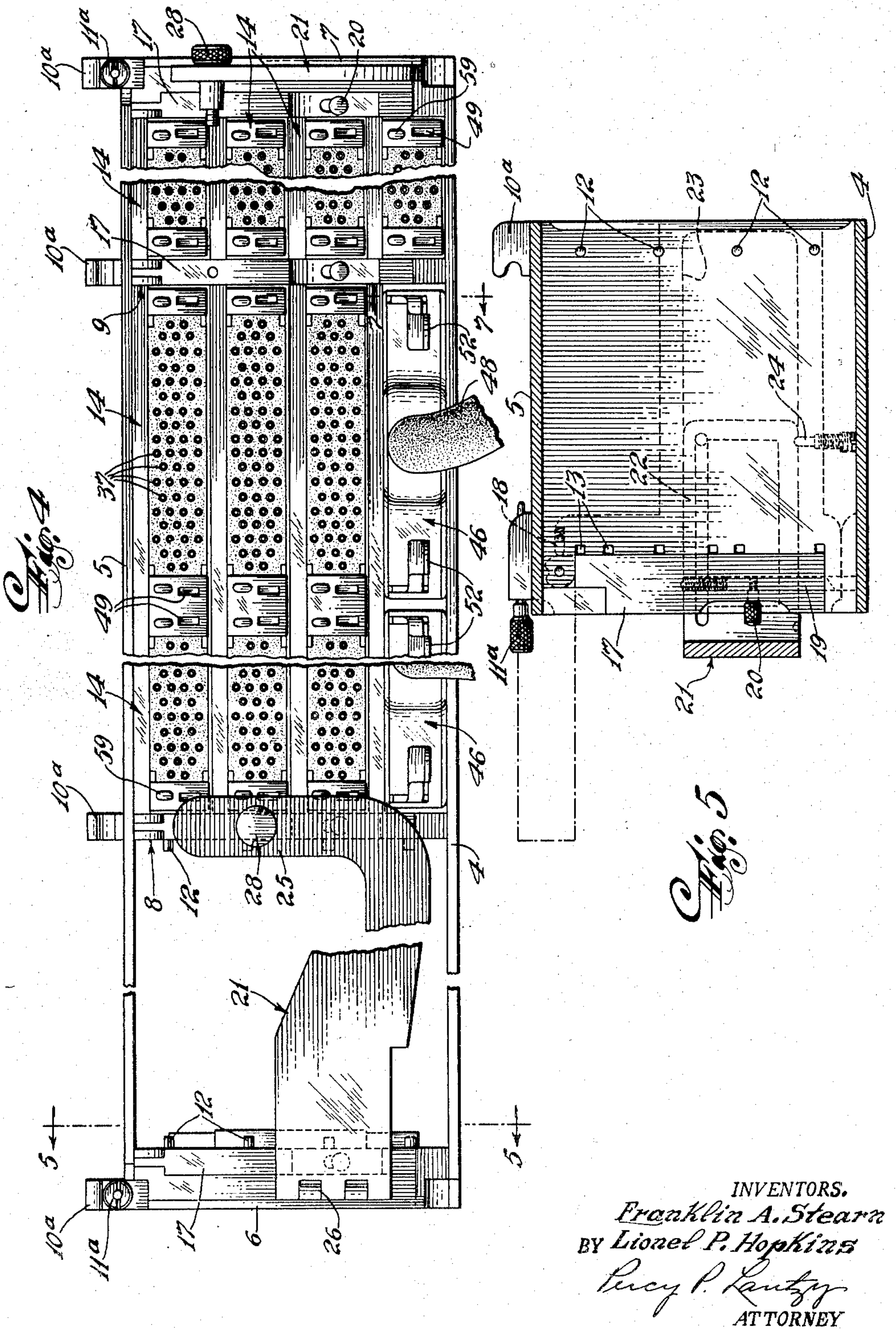
Fig. 4 is a rear view of the box-like section of Figs. 2 and 3 showing two cable connectors for one of the switchboard units thereof.
Fig. 5 is a sectional view taken along line 5—5 of Fig. 4.

The cable connector, Figs. 3 and 7, comprise a body 46 having one wall thereof provided with a plurality of terminals 47 corresponding to the terminals 37 of one of the groups 39 or 40. While the terminals 47 which are connected to wires in cable 48 are shown fixed, could of course, be provided with springs similar to those of contacts 37 if desired, and the contacts 37 be of the fixed type. It is preferred, however, to provide the cable connector with fixed contacts since it is more likely to meet abuse and be dragged on the ground.

In order to secure the connector 46 to the unit 14, the units 14 are provided with latch recesses 49 which cooperate with hook extensions 50 on latches 51. Each latch 51 extends lengthwise of the connector 46 with a thumb-piece 52 projecting from the rear side of the connector. The latch is retained on pin 53 by a slot 54 which permits lengthwise movement of the latch. At the rear of the connector is a cam 55 which coacts with the thumb-piece 52 for latching purposes. To fasten the cable connector to the unit 14, it is brought adjacent thereto and the latches 51 pushed into the recesses 49, and while the connector is held against the unit 14 the thumb-pieces 52 are forced crosswise of cams 55 thereby causing the latch to pivot about pin 53 and to move rearwardly thereby causing the latch hook 50 to move through an arc to engage shoulder 56 adjacent recess 49. This rearward movement of the latch is produced by the cam 55 which when the latch is in fully engaged position retains the latch by the cam entering a recess 57 on the finger-piece 52. As shown in Fig. 3 each cable connector includes two such latches, one for each side, so as to make a firm connection with the unit 14. The action of the latch is important in that the cam tightening thereof forces the cable connector to a given position with respect to the unit thereby insuring proper electrical contact between the terminals of connector 46 and unit 14. To further ensure proper alignment, the units 14 are provided with locating studs 59 which are received in recesses 60 in the connector 46.

While we have described above the principles of our invention in connection with specific apparatus, it is to be clearly understood that this description is made only by way of example and not as a limitation to the scope of our invention.

We claim:

1. A telephone switchboard comprising a base, a plurality of box-like sections, means to secure said sections to said base and to one another to form a self-supporting bank of said sections, jack and indicator units receivable in at least certain of said sections, means for securing said units in said sections, each unit having a plurality of terminals in the rear end thereof, a cable connector for each unit, each connector having a plurality of terminals and means for releasably securing said connector to said unit with the terminals thereof in engagement with corresponding terminals of said unit.

2. A telephone switchboard according to claim 1 wherein one of the groups of terminals of the cable connector and jack and indicator unit are provided with biasing springs operatively positioned within said terminals to maintain said terminals in resilient contact when said cable connector is secured to a particular unit.

3. A telephone switchboard according to claim 1 wherein at least certain of said sections are provided with a bracket extending rearwardly therefrom and operatively positioned to support cables associated with the cable connectors secured to said units.

4. A telephone switchboard according to claim 3 wherein said certain box-like sections are provided with recesses at the ends thereof and said brackets are provided with a hinge so that when the bracket is withdrawn from said recess to expose the axis of the hinge the outwardly extending portion of the bracket may be swung adjacent to the rear side of said section, means for securing the bracket to the rear side of said section, and said recess being of a length sufficient to receive the bracket hinge and thereby maintain the bracket straight for extension rearwardly of the section for the support of cables.

5. In a telephone switchboard having a dismountable sectional frame, jack and indicator units receivable between the walls of said frame, said walls and units having cooperating guiding means to locate said units in a stacked relation, and means for securing said units in said frame including a clamp hinged at one end to a wall of said frame, said clamp being adapted to overlie in clamping relation the edge of said wall and parts of the units adjacent thereto, and a latch for retention of said clamp in said clamping relation.

6. In a telephone switchboard according to claim 5 wherein each of the jack and indicator units is provided with a plurality of terminals on the rear wall thereof, a cable connector for each unit, each unit having a plurality of terminals, and means for releasably securing said connector to said unit with the terminals thereof in engagement with corresponding terminals of said unit.

7. In a telephone switchboard according to claim 6 wherein one group of terminals of the unit and cable connector include springs operatively positioned within said terminals and biased to urge the terminals outwardly with resilient force whereby when the connector is secured to a unit the terminals are maintained in contact by said resilient force.

8. In a telephone switchboard according to claim 5 wherein said frame is provided with a recess in at least one of the walls thereof, an L-shaped bracket normally receivable in said recess, said bracket having a hinge operatively positioned thereon to permit said bracket to be swung from said recess to a position projecting rearwardly of said frame, said bracket when in said last named position serving as a support for cable leading to said cable connector.

9. The telephone switchboard according to claim 8 and further comprising means on said bracket for securing said bracket within said recess in said frame and detent means operatively positioned to secure said bracket in said rearwardly projecting position.

10. A combination switch board unit and cable connector comprising a unit for switch boards having a plurality of terminals protruding from a wall thereof, a cable connector having a plurality of terminals protruding from a wall thereof, a cam and latch arrangement comprising a latch extending beyond the wall of the connector containing said terminals and adapted to engage in a recess in said unit, a cam projection on said connector engageable by said latch when the latch is moved thereagainst to cause the projected end of said latch to catch onto a part of the unit defining said recess, and said latch having a detent for releasably engaging said cam.

11. In the combination according to claim 10 wherein said connector has two such latches, one at each side thereof and said unit has two such recesses spaced for reception of said latches.

FRANKLIN A. STEARN.
LIONEL P. HOPKINS.

REFERENCES CITED

The following references are of record in the file of this patent:

UNITED STATES PATENTS

| Number | Name | Date |
|---|---|---|
| 385,846 | Cook | July 10, 1888 |
| 472,947 | Goodridge | Apr. 12, 1892 |
| 1,039,773 | McLarn | Oct. 1, 1912 |
| 1,519,499 | Menefee | Dec. 16, 1924 |
| 1,795,930 | Calkins | Mar. 10, 1931 |
| 1,999,497 | Arndt | Apr. 30, 1935 |
| 2,459,237 | Mentor | Jan. 18, 1949 |